US009751144B2

(12) United States Patent
Wu et al.

(10) Patent No.: US 9,751,144 B2
(45) Date of Patent: Sep. 5, 2017

(54) CABLE CONNECTOR ASSEMBLY WITH CABLE WIRES MADE OF HEAT-RESISTING MATERIAL

(71) Applicant: FOXCONN INTERCONNECT TECHNOLOGY LIMITED, Grand Cayman (KY)

(72) Inventors: Jerry Wu, Irvine, CA (US); Jun Chen, Kunshan (CN); Fan-Bo Meng, Kunshan (CN)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 172 days.

(21) Appl. No.: 14/853,887

(22) Filed: Sep. 14, 2015

(65) Prior Publication Data

US 2016/0079689 A1   Mar. 17, 2016

(30) Foreign Application Priority Data

Sep. 12, 2014   (CN) .................... 2014 2 0523001 U (51) Int. Cl.
| | |
|---|---|
| B23K 1/00 | (2006.01) |
| B23K 26/22 | (2006.01) |
| B23K 26/24 | (2014.01) |
| B23K 26/32 | (2014.01) |
| B23K 101/38 | (2006.01) |

(52) U.S. Cl.
CPC ............ *B23K 1/0016* (2013.01); *B23K 26/22* (2013.01); *B23K 26/24* (2013.01); *B23K 26/32* (2013.01); *B23K 2201/38* (2013.01)

(58) Field of Classification Search
CPC ...... B23K 1/0016; B23K 26/22; B23K 26/24; B23K 26/32; B23K 2201/38; H01R 9/0506; H01R 12/775; H01R 12/956; Y10S 439/942
USPC ........................ 439/581, 98, 497, 579, 942
See application file for complete search history.

(56) References Cited

U.S. PATENT DOCUMENTS

| | | | |
|---|---|---|---|
| 6,685,511 B2 * | 2/2004 | Akama | H01R 12/62 439/108 |
| 6,857,898 B2 * | 2/2005 | Engquist | H01R 9/0515 439/493 |
| 8,133,071 B2 | 3/2012 | Huang et al. | |

(Continued)

*Primary Examiner* — Tulsidas C Patel
*Assistant Examiner* — Travis Chambers
(74) *Attorney, Agent, or Firm* — Ming Chieh Chang; Wei Te Chung (57) ABSTRACT

A cable connector assembly includes a PCB defining some second conductive pads disposed on a rear end portion of the PCB and some third conductive pads disposed behind the second conductive pads, a cable defining a number of coaxial wires and single wires, and a housing. Each coaxial wire has a first inner conductor, an inner insulative layer enclosing the first inner conductor, a metal braided layer soldered to the corresponding third conductive pads, and an outer insulative layer. Part of the coaxial wires and single wires adjacent to the coaxial wires are disposed on at least one surface of the PCB. Each single wire has a second conductor, a first insulative layer, and a second insulative layer. The first insulative layer is made of heat-resisting material to prevent the adjacent single wires from being damaged when soldering the metal braided layer of the coaxial wires.

20 Claims, 10 Drawing Sheets

(56) References Cited

U.S. PATENT DOCUMENTS

| | | | | |
|---|---|---|---|---|
| 8,662,917 | B2* | 3/2014 | Wang | H01R 9/038 |
| | | | | 439/493 |
| 9,049,787 | B2* | 6/2015 | Bugg | H01R 9/032 |
| 9,356,365 | B2* | 5/2016 | Yamada | H01R 9/0515 |
| 9,373,915 | B1* | 6/2016 | Schulz | H01R 13/6594 |
| 9,466,925 | B2* | 10/2016 | Rost | H01R 9/032 |
| 2003/0121694 | A1* | 7/2003 | Grogl | H01B 3/441 |
| | | | | 174/113 R |
| 2012/0252266 | A1* | 10/2012 | Ling | H01R 9/038 |
| | | | | 439/581 |
| 2014/0307809 | A1* | 10/2014 | Lo | H04B 3/28 |
| | | | | 375/257 |

* cited by examiner

CABLE CONNECTOR ASSEMBLY WITH CABLE WIRES MADE OF HEAT-RESISTING MATERIAL

BACKGROUND OF THE INVENTION

1. Field of the Invention

The present invention relates to a cable connector assembly, and more particularly to a structure of core wires thereof.

2. Description of Related Arts

U.S. Pat. No. 8,133,071, issued on Mar. 13, 2012, shows a cable connector assembly including a flat cable and a flexible printed circuit. The cable defines a row of core wires and an insulative layer enclosing the core wires. The core wires comprise a plurality of coaxial cables and a plurality of single wires. The flexible printed circuit comprises a plurality of pads arranged in a line and a lengthwise grounding portion separated from the pads. Each coaxial cable comprises an inner conductor connected to a corresponding pad and an outer conductor connected to the grounding portion. The single wires comprise a plurality of power wires connected to corresponding pads and a plurality of grounding wires connected to the grounding portion. The coaxial cables and the single wires are arranged in one row. When soldering the coaxial wires, outer insulative layers of adjacent single wires might be damaged.

An improved cable connector assembly is desired to offer advantages over the related art.

SUMMARY OF THE INVENTION

An object of the present invention is to provide a cable connector assembly with good electrically connection.

To achieve the above-mentioned object, a cable connector assembly includes an internal printed circuit board (PCB), a cable electrically connected to the PCB and defining a plurality of coaxial wires and a plurality of single wires, and a housing receiving the PCB. The PCB defines a front end portion, an opposite rear end portion, and a middle portion. The PCB includes a plurality of first conductive pads disposed on the front end portion, a plurality of second conductive pads disposed on the rear end portion and connected to the cable, and a plurality of third conductive pads disposed behind the second conductive pads. The PCB has an upper surface and an opposite lower surface. Each coaxial wire has a first inner conductor soldered to the corresponding second conductive pad, an inner insulative layer enclosing the first inner conductor, a metal braided layer enclosing the inner insulative layer and soldered to the corresponding third conductive pads, and an outer insulative layer enclosing the metal braided layer. Some of the coaxial wires and single wires adjacent to and arranged in a row with the coaxial wires are disposed on at least one surface of the PCB. Each single wire has a second conductor soldered to the corresponding second conductive pads, a first insulative layer enclosing the second conductor, and a second insulative layer enclosing the first insulative layer. The first insulative layer is made of heat-resisting material to prevent the adjacent single wires from being damaged when soldering the metal braided layer of the coaxial wires.

According to the present invention, the first insulative layer of the single wire adjacent to the coaxial wires is further enclosed by the second insulative layer. It efficiently prevents the single wires from damage when soldering the metal braided layer of the coaxial wires.

DETAILED DESCRIPTION OF THE PREFERRED EMBODIMENT

Referring to FIGS. 1 to 7, a cable connector assembly 100 in accordance with the present invention for mating with a mating connector (not shown) comprises a mating member 1, an inner printed circuit board (PCB) 2 connected to the mating member 1, a cable 3 electrically connected with the PCB 2, a spacer 4 locating the cable 3, an inner member 5 enclosing part of the cable 3 and the mating member 1, a strain relief 6 molded out of the cable 3 and the inner member 5, and a housing 7 disposed outside. The cable connector assembly 100 can be mated with the mating connector in two different directions to achieve the same function.

Figure 9:
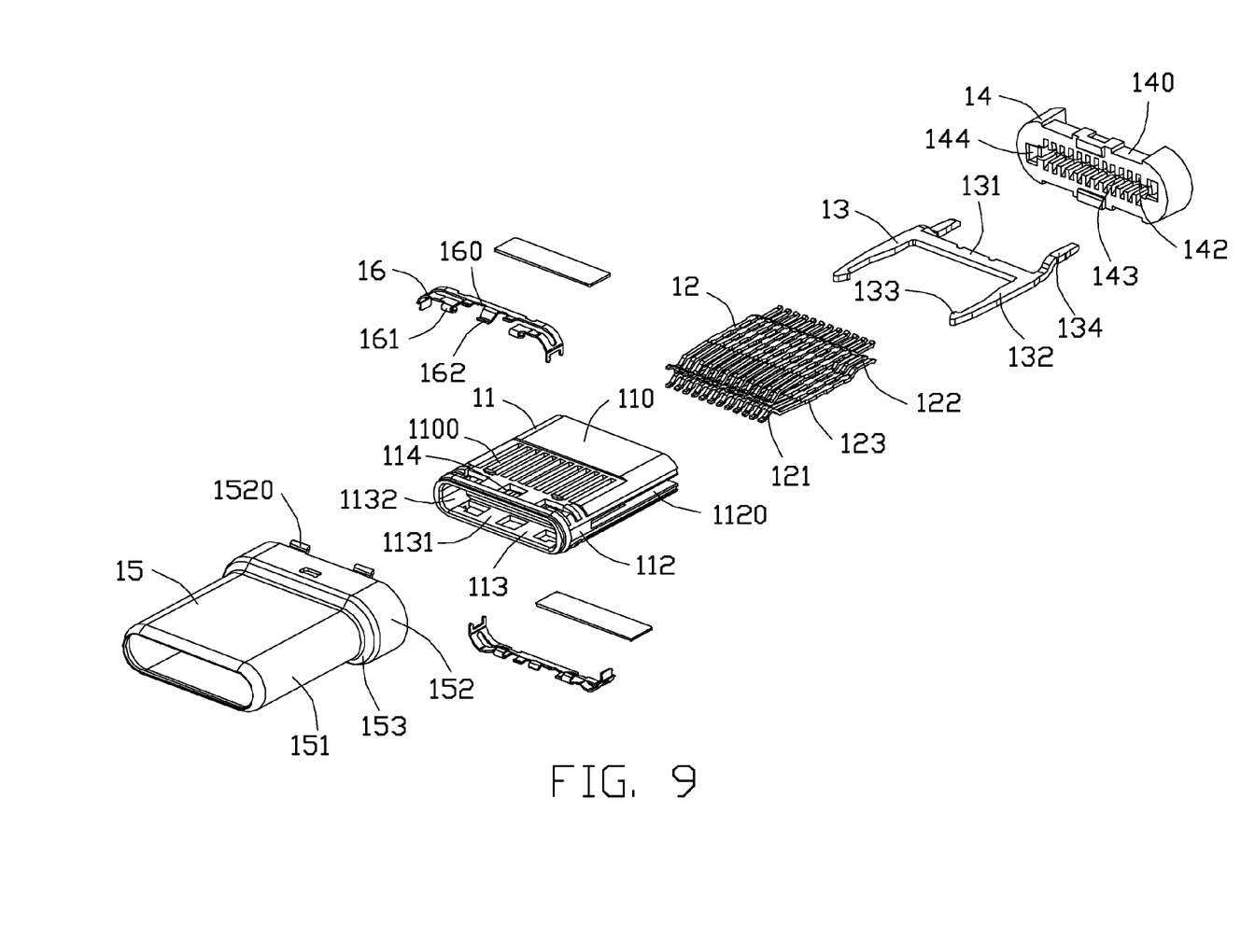
FIG. 9 is an exploded view of the mating member of the cable connector assembly as shown in FIG. 1.
Figure 10:
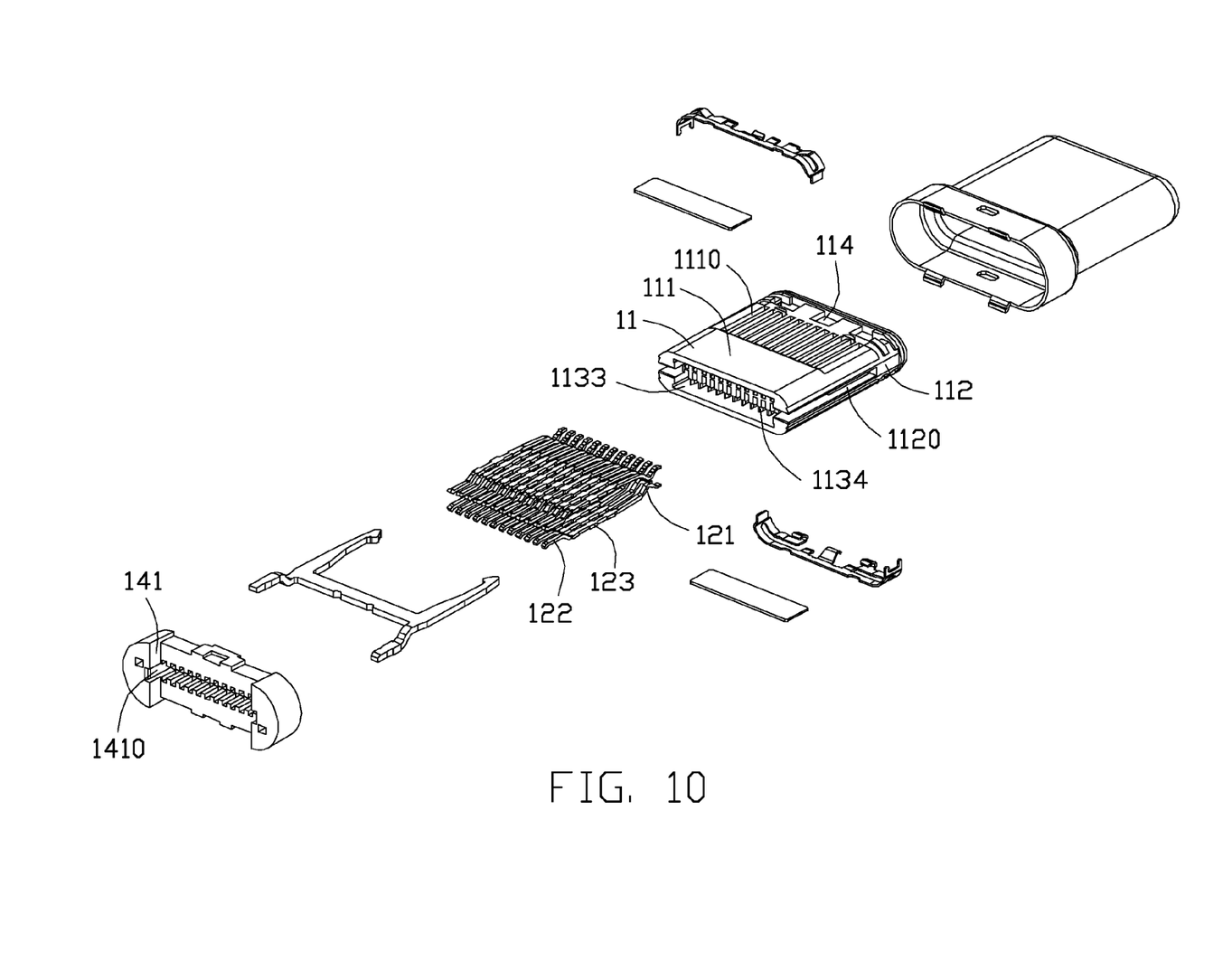
FIG. 10 is another exploded view of the mating member of the cable connector assembly as shown in FIG. 9 but from a different perspective.

Referring to FIGS. 9 and 10, the mating member 1 comprises an insulative housing 11, a plurality of conductive terminals 12 received in the insulative housing 11 and arranged in two rows spaced apart from each other in a vertical direction, a latch 13 disposed between the two rows of conductive terminals 12 for latching with the mating connector, an insulative member 14 disposed behind the insulative housing 11, a metal shell 15 disposed outside of the insulative housing 11 and the insulative member 14, and a pair of grounding members 16 disposed on the insulative housing 11 and electrically connected to the metal shell 15.

The insulative housing 11 comprises a top wall 110, a bottom wall 111 spaced apart from and parallel with the top wall 110, a pair of side walls 112 connecting the top wall 110 and the bottom wall 111, and a receiving room 113 surround by the top, bottom, and side walls. The receiving room 113 is divided into a front portion 1132 having a front opening 1131, and a rear portion 1134 having a rear opening 1133. The top wall 110 defines a plurality of top recesses 1100 in communication with the front portion 1132. The bottom wall 111 defines a plurality of bottom recesses 1110 in communication with the front portion 1132. Each of the side walls 112 defines a side recess 1120 extending forwardly from a rear end of the insulative housing 11 but not through a front end of the insulative housing 11. The side recesses 1120 are in communication with the front portion 1132 and the rear portion 1134 of the receiving room 113. A plurality of recessing holes 114 are formed on a front end of the top wall 110 and the bottom wall 111.

Each of the contacts 12 comprises a front mating portion 121 extending forwardly into the front portion 1132 of the receiving room 113, a rear mating portion 122 extending rearwardly, and an intermediate mounting portion 123 secured to the insulative housing 11. The front mating portion 121 is to be mated with the mating connector and the rear mating portion 122 is to be mated with the PCB 2. The front mating portions 121 of the two rows of contacts 12 are arranged face to face along the vertical direction.

The latch 13 comprises a base portion 131 extending along a transverse direction, a pair of latch beams 132 respectively extending forwardly from two opposite ends of the base portion 131, a latch portion 133 extending from a front end of each latch beam 132 along a face to face direction, and an extending beam 134 extending opposite to the latch beam 132 from two ends of the base portion 131. One extending beam 134 is higher than the plane of the base portion 131, and another extending beam 134 is lower than the plane of the base portion 131. The latch 13 is mounted into the insulative housing 11 through the rear opening 1133 of the rear portion 1134 of the receiving room 113. The latch beams 132 are received into the corresponding side recesses 1120, respectively. At least a portion of each latch portion 133 projects into the front portion 1132 of the receiving room 113. The pair of latch portions 133 are arranged face to face along the transverse direction.

The insulative member 14 cooperates with the insulative housing 11 to fix the latch 13. The insulative member 14 comprises an insulative base portion 140, a pair of extending portions 141 respectively extending rearwardly from two opposite ends of the insulative base portion 140, two rows of through holes 142 spaced apart in the vertical direction and extending through the insulative base portion 140 along a front to rear direction, a receiving slot 143 disposed between two rows of the through holes 142 and communicated with the through holes 142, and a pair of receiving holes 144 disposed on two sides of the receiving slot 143. The extending portion 141 comprises a mounting slot 1410 extending along a front to rear direction. When the insulative member 14 is mounted to the insulative housing 11 along a rear to front direction, the contacts 12 are inserted into two rows of the through holes 142, the base portion 131 is received in the receiving slot 143, and the pair of extending beams 134 extend into the corresponding receiving hole 144.

The metal shell 15 has a closed circumference that has a good seal performance, a good anti-EMI performance, etc. The closed circumference of the metal shell 15 could be manufactured by drawing a metal piece, bending a metal piece, die casting, etc. The metal shell 15 comprises a first front end 151 for being inserted into the mating connector, a first rear end 152, and a first transition portion 153 for connecting the first front end 151 and the first rear end 152. A shape of the first rear end 152 is in the shape of the insulative member 14. A diametrical dimension of the first front end 151 is smaller than the diametrical dimension of the first rear end 152. The first rear end 152 comprises a pair of latch tabs 1520 projecting outwardly.

One of the grounding members 16 is received on the top recess 1110, and the other one is received on the bottom recess 1110. Each of the grounding members 16 comprises a flat body portion 160, a pair of spring tabs 161 extending and bending from the flat body portion 160 toward the insulative housing 11, a grounding tab 162 extending forwardly from a front side of the flat body portion 160 and entering into the front portion 1132 of the receiving room 113. The spring tabs 161 and the grounding tab 162 are received in the recessing holes 114. The grounding tabs 162 are disposed face to face along the vertical direction and used for mating with the mating connector. A distance along the vertical direction between the grounding tabs 162 of the pair of grounding members 16 is greater than a distance along the vertical direction of the front mating portions 121 of the two rows of contacts 12.

Figure 6:
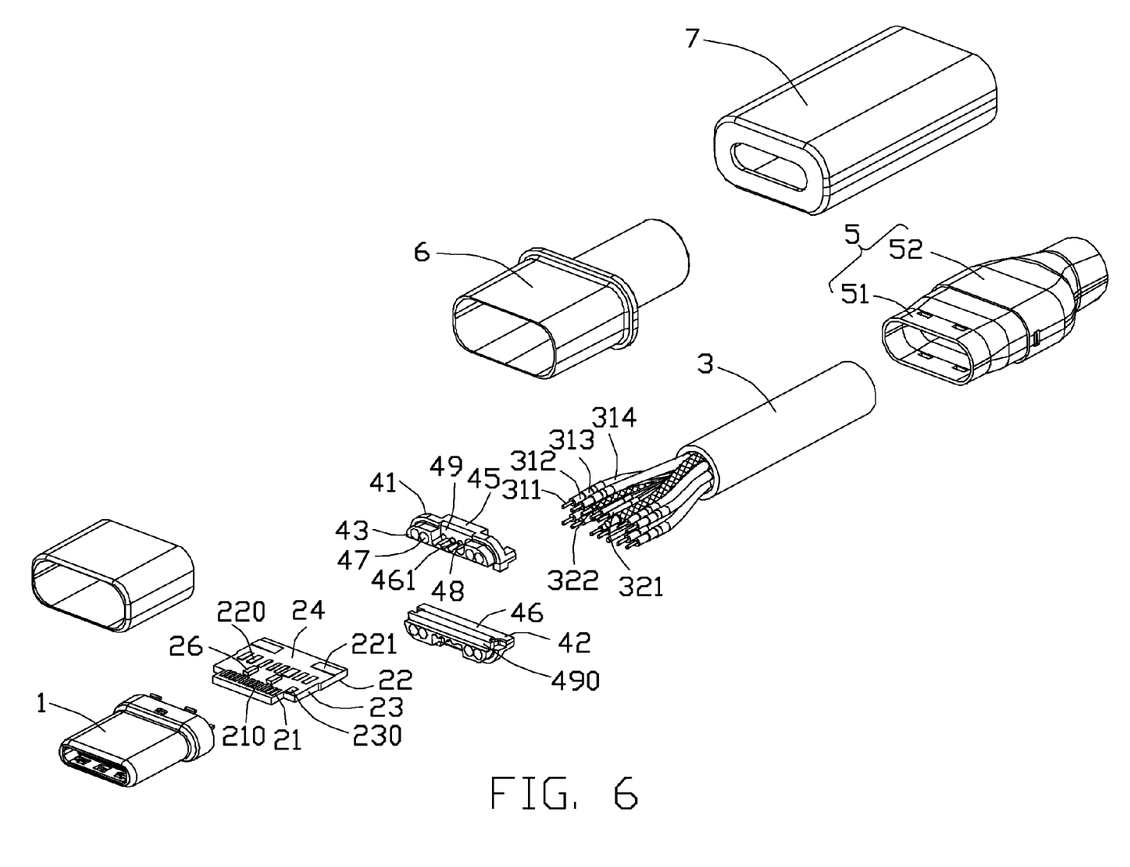
FIG. 6 is an exploded view of the cable connector assembly as shown in FIG. 1.
Figure 7:
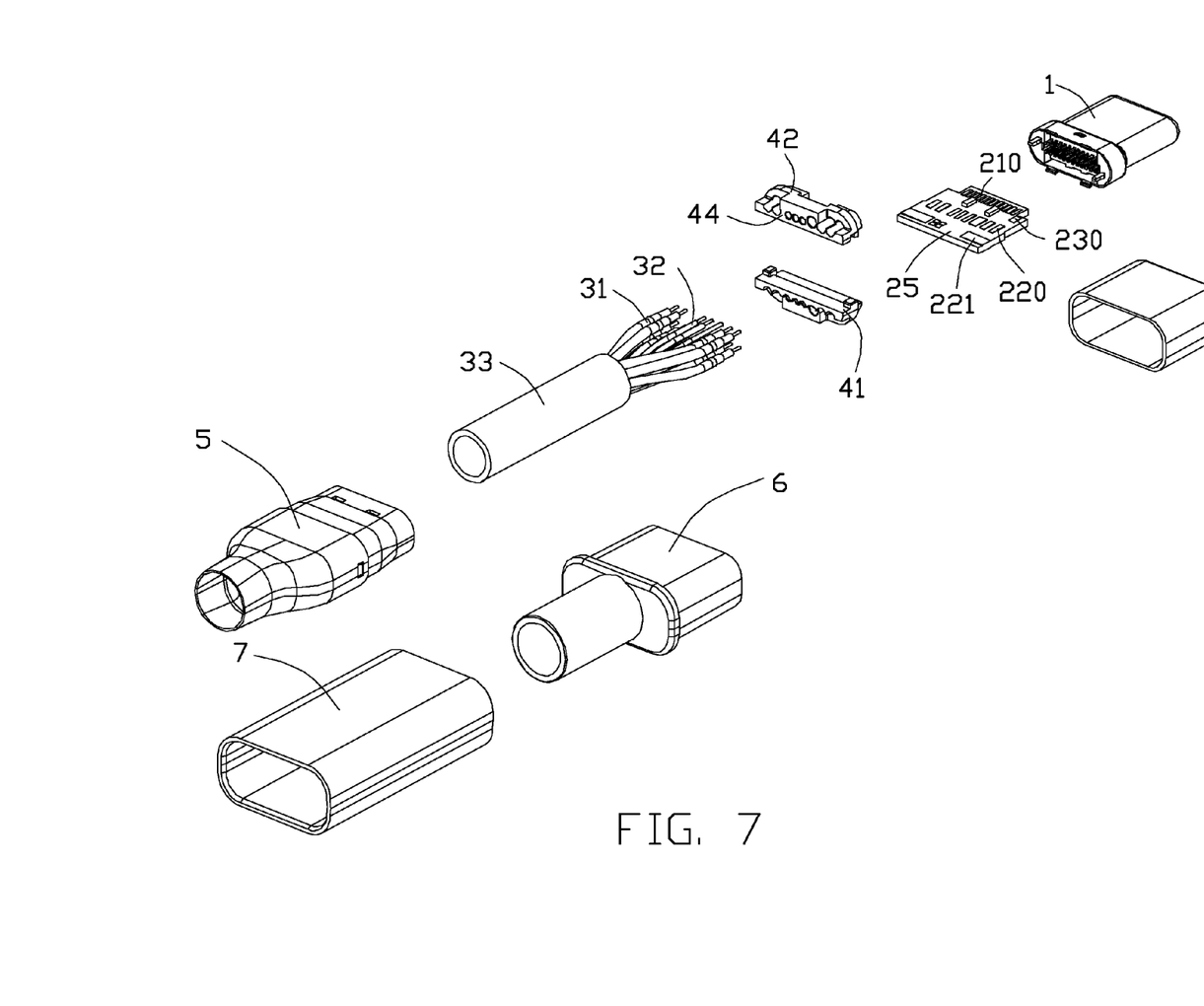
FIG. 7 is another exploded view of the cable connector assembly as shown in FIG. 6 but from a different perspective.

Referring to FIGS. 6 and 7, the PCB 2 is disposed between the mating member 1 and the cable 3. The cable 3 is electrically connected with the contacts 12 by the PCB 2. The PCB 2 comprises a front end portion 21, a rear end portion 22, and a middle portion 23 connecting the front end portion 21 and the rear end portion 22. The PCB 2 comprises an upper surface 24 and an opposite lower surface 25. The upper and the lower surface of the front end portion 21 comprise a plurality of first conductive pads 210 connected with the rear mating portion 122 of the contacts 12, while the upper and the lower surface of the rear end portion 22 comprise a plurality of second conductive pads 220 connected to the cable 3. A plurality of third conductive pads 221 are disposed behind the second conductive pads 220. A size of the front end portion 21 of the PCB 2 is smaller than the size of the rear end portion 22 along a transverse direction. A pitch between the adjacent first conductive pads 210 is smaller than the pitch between the adjacent second conductive pads 220. The size of the second conductive pad 220 is larger than the size of the first conductive pad 210, and the number of the first conductive pads 210 is larger than the number of the second conductive pads 220. Both the middle portion 23 of the upper and the lower surface comprise a metal pad 230 for soldering with the extending beam 134 of the latch 13 to fasten the latch 13.

The front portion 21 of the PCB 2 is mounted in the mounting slot 1410 and between the rear mating portions 122 of the two rows of contacts 12. The rear mating portions 122 of the contacts 12 are electrically connected with the corresponding first conductive pads 210. A plurality electronic elements 26 are disposed on the PBC 2.

Figure 8:
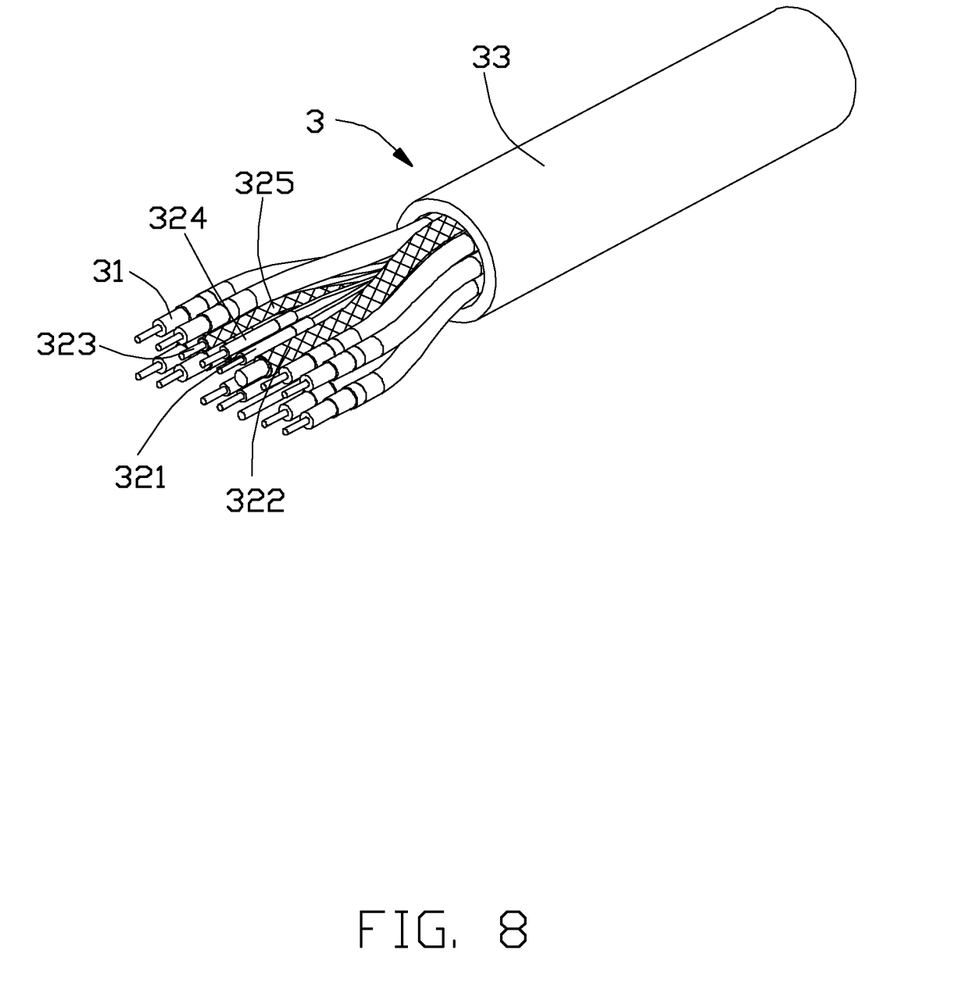
FIG. 8 is a perspective view of the cable of the cable connector assembly as shown in FIG. 7.

Referring to FIGS. 6 to 8, the cable 3 has a sheath 33 that contains a plurality of coaxial wires 31 and a plurality of single wires 32. Some of the coaxial wires 31 and single wires 32 adjacent to and arranged in a row with the coaxial wires 31 are disposed on at least one surface of the PCB 2. Each coaxial wire 31 has a first inner conductor 311 soldered to the corresponding second conductive pad 220, an inner insulative layer 312 enclosing the first inner conductor 311, a metal braided layer 313 enclosing the inner insulative layer 312 and soldered to the corresponding third conductive pads 221, and an outer insulative layer 314 enclosing the metal braided layer 313. The single wires 32 comprise a plurality of first single wires 321 and a plurality of second single wires 322 disposed adjacent to the coaxial wires 31. Each first single wire 321 and each second single wire 322 defines a second conductor 323 and a first insulative layer 324 enclosing the second conductor 323. The second single wire 32 further defines a second insulative layer 325 enclosing the first insulative layer 324. The first insulative layer 324 of the second single wire 322 is made of heat-resisting material to prevent the second single wires 322 from being hurt when soldering the metal braided layer 313 of the coaxial wires 31. The first insulative layer 324 enclosed in the second insulative layer 325 is made of PTFE (Polytetrafluoroethylene). The heat resistance of the PTFE is strong. So it is difficult to result short circuit when soldering the metal braided layer 313 to the third conductive pads 221. The second insulative layer 325 is made of PET (Polyethylene terephthalate). The good adhesive performance prevents the cable 3 from moving after using the glue to fix the cable with the spacer 4. The first insulative layer 325 of the first single wires 321 can be made of PET or other material having good adhesive performance to convenient the glue to fix the first single wires 321.

In this embodiment, only the single wires 32 adjacent the coaxial wires 31 on the upper surface 24 of the PCB 2 are disposed the second insulative layer 325. Because one position adjacent to the coaxial wire 31 on the lower surface 25 is disposed a bare wire, and another position is empty. So it is unnecessary to dispose second insulative layer 325 on the wire on the lower surface 25. In other embodiments, it can set up second insulative layer 325 according to the necessity. The single wires 32 are disposed on a middle portion of the PCB 2, while the coaxial wires 31 are disposed on two sides of the PCB 2. In this embodiment, there are seven single wires 32 and eight coaxial wires 31. In other embodiments, the number of the wires can be changed.

In this embodiment, the spacer 4 comprises an upper half 41 holding some coaxial wires 31 and some single wires 32 on the upper surface 24 and a lower half 42 mounted to the upper half 41 holding the rest coaxial wires 31 and single wires 32 on the lower surface 25. The spacer 4 also can be disposed in one piece in other embodiments. Each upper half 41 and lower half 42 comprises a front wall 43 proximal to the PCB 2, an opposite rear wall 44, and an upper wall 45 and a lower wall 46 connecting the front wall 43 and the rear wall 44. The spacer 4 comprises a plurality of first positioning holes 47 and a plurality of second positioning holes 48 passing through the front wall 43 and the rear wall 44. The first positioning holes 47 are used for locating the coaxial wires 31, and the second positioning holes 48 are used for locating the single wires 32. The spacer 4 comprises a notch 49 passing through the front wall 43 and the upper wall 45 and communicated with the second positioning holes 48. When cutting the coaxial wires 31, the single wires 32 can be bent into the notch 49 to avoid being hurting. Both the upper half 41 and the lower half 42 comprise the notch 49, the first and second positioning holes. A plurality of limiting slots 461 are formed on the bottom wall 46 of the notch 49 for limiting the single wires 32 to move in a transverse direction. The front end of the spacer 4 comprises a holding slot 490 for holding the PCB 2.

Figure 1:
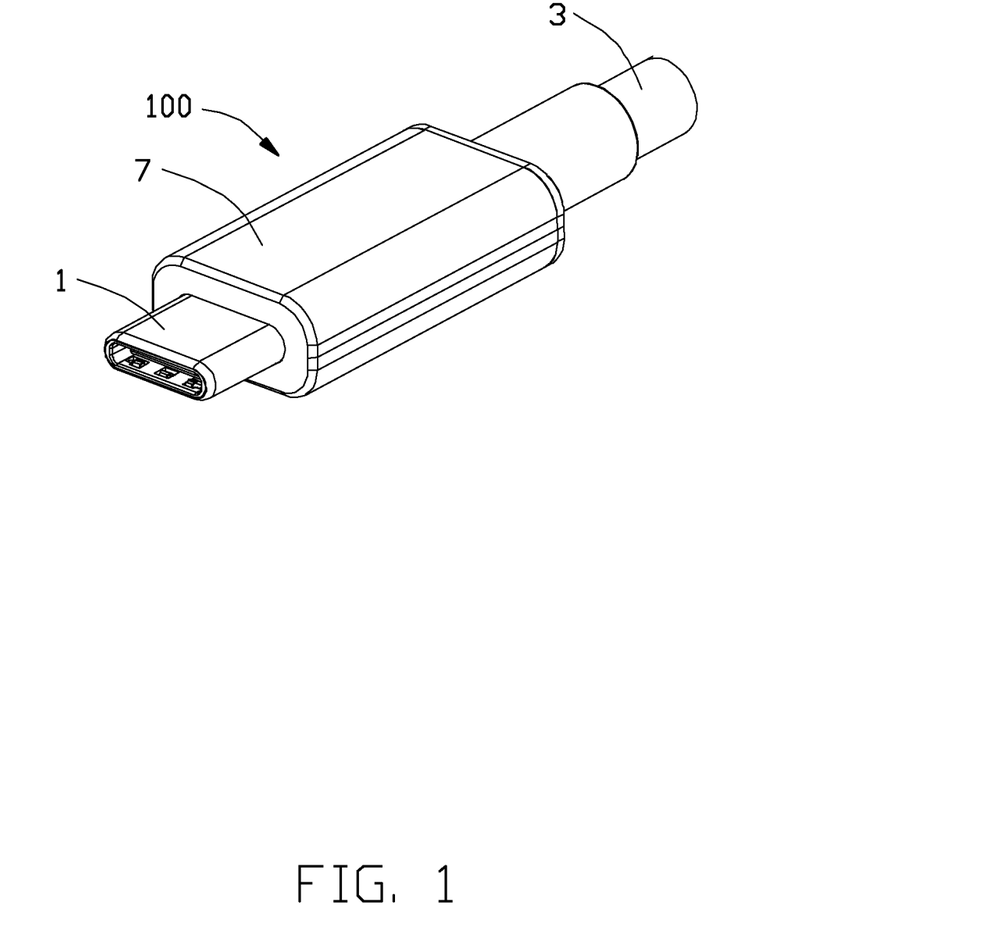
FIG. 1 is a perspective view of a cable connector assembly in accordance with the present invention.
Figure 2:
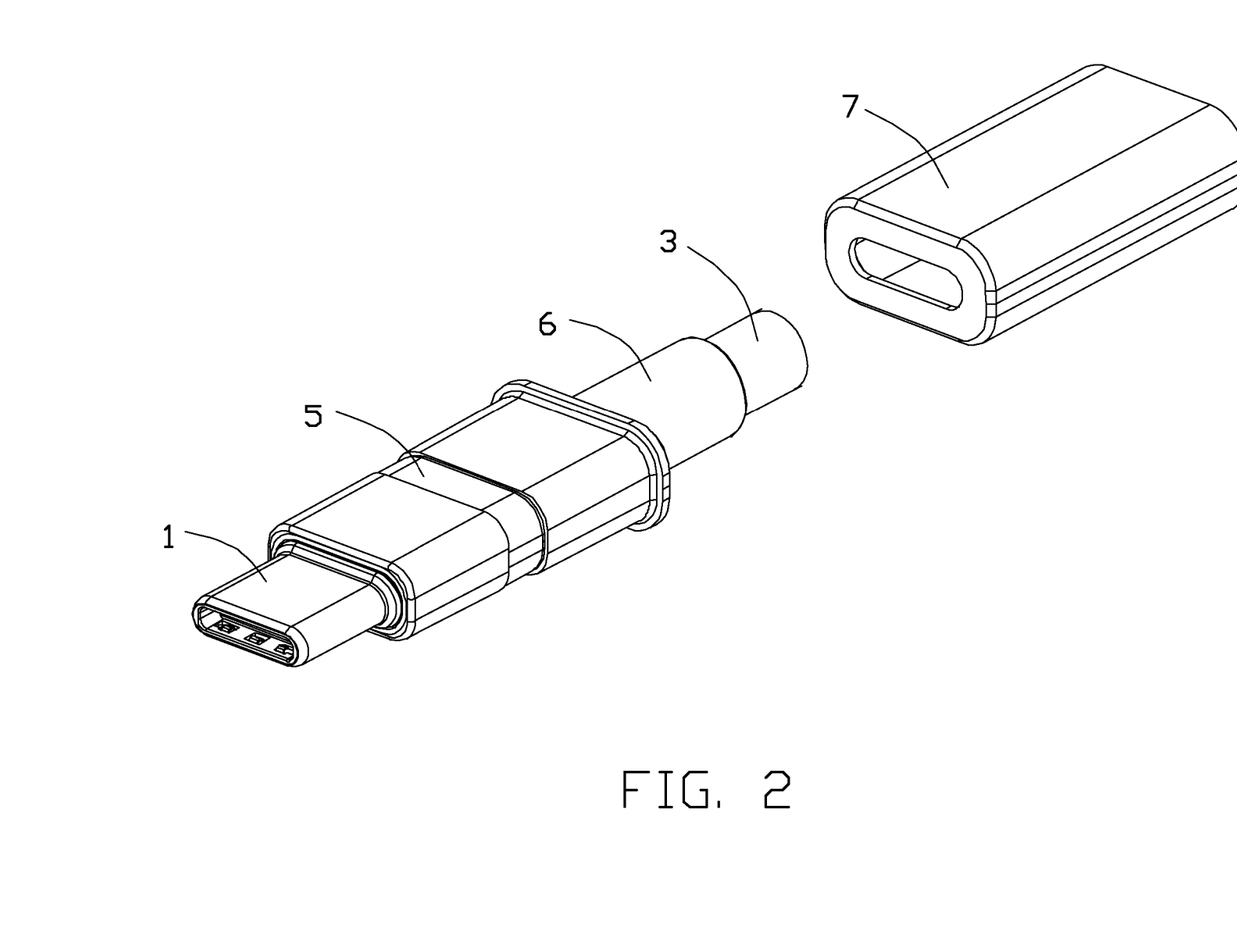
FIG. 2 is a partially exploded view of the cable connector assembly as shown in FIG. 1.
Figure 3:
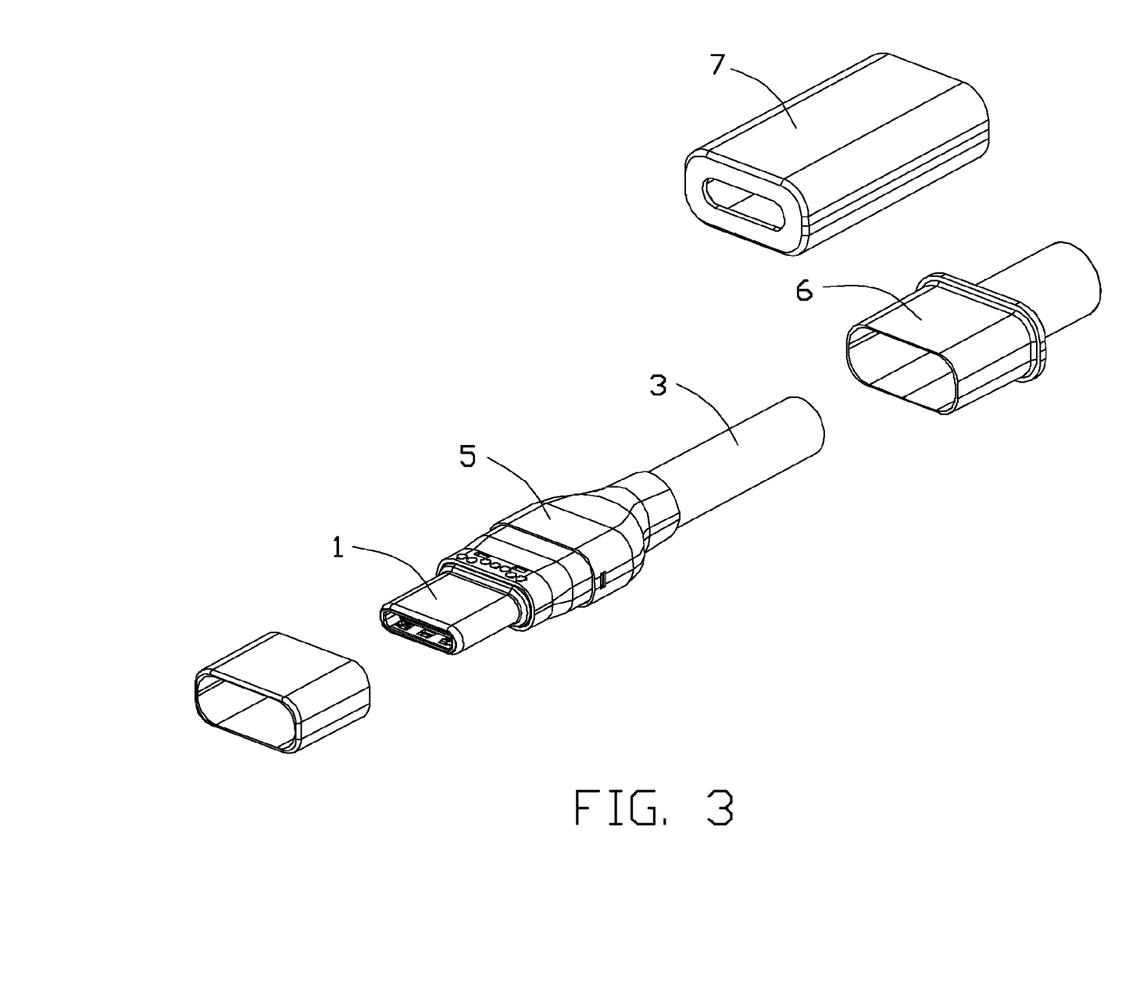
FIG. 3 is another partially exploded view of the cable connector assembly as shown in FIG. 1.
Figure 4:
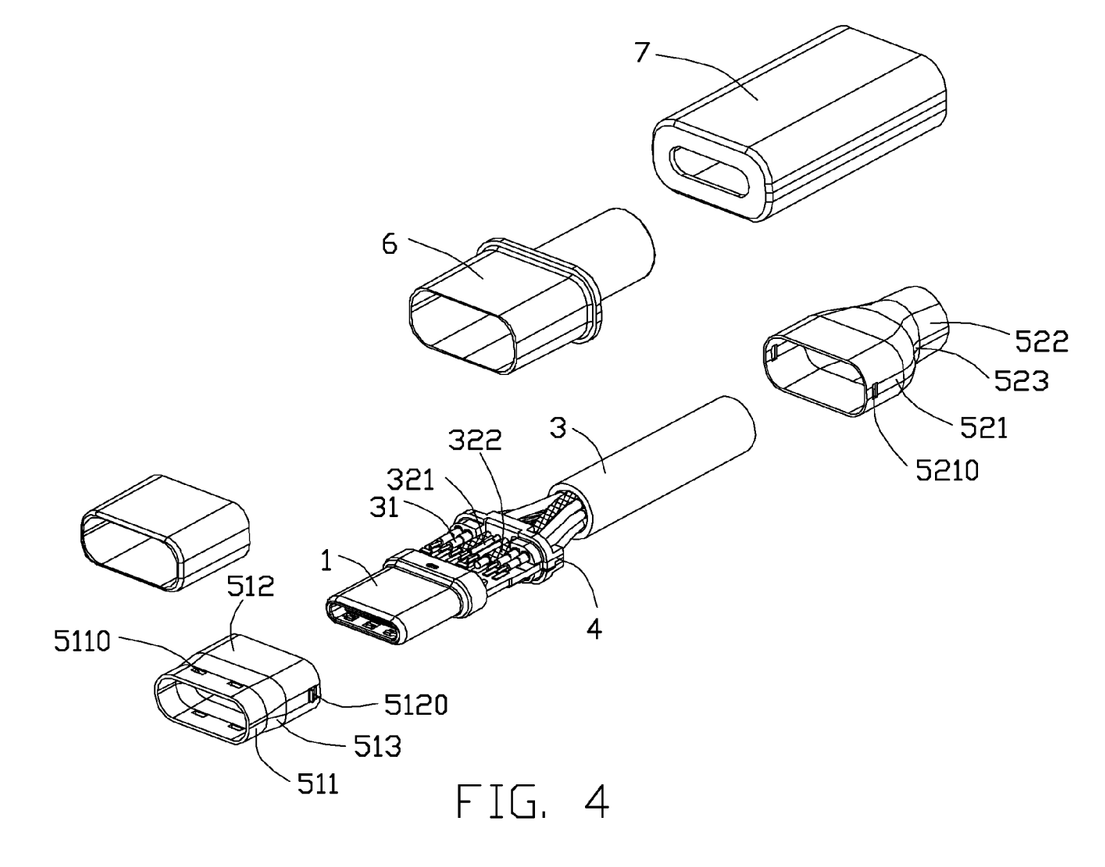
FIG. 4 is another partially exploded view of the cable connector assembly as shown in FIG. 1.
Figure 5:
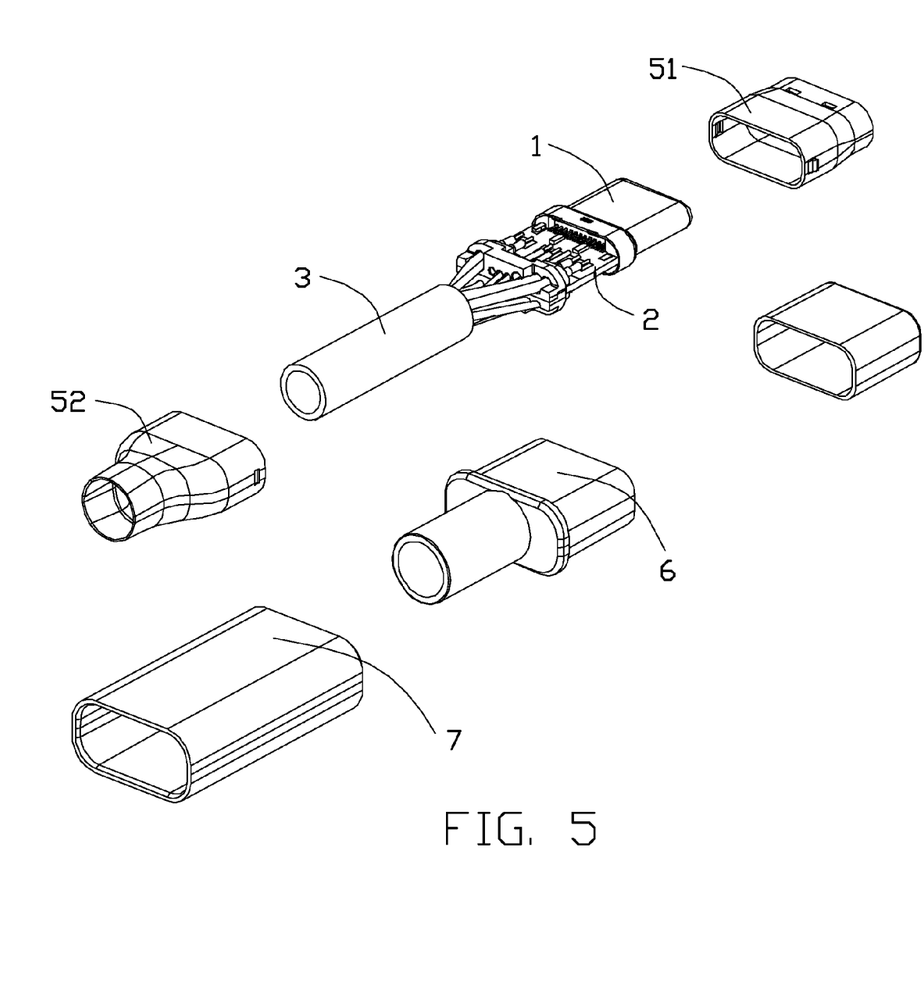
FIG. 5 is a partially exploded view of the cable connector assembly as shown in FIG. 4 but from a different perspective.

Referring particularly to FIGS. 3 and 4, the inner member 5 comprises a first member 51 and a second member 52. The first member 51 has a closed circumference that has a good seal performance, a good anti-EMI performance, etc. The closed circumference of the first member 51 could be manufactured by drawing a metal piece, bending and forming a metal piece, die casting, etc. The first member 51 comprises a second front end 511 telescoped with a rear end of the mating member 1, a second rear end 512 opposite to the second front end 511, and a second transition portion 513 between the second front and rear ends. The diametrical dimension of the second front end 511 is smaller than the diametrical dimension of the second rear end 512. The second front end 511 defines a pair of latch holes 5110 latched with the latch tabs 1520 of the metal shell 15, when the second member 51 is telescoped on an outer side of the first rear end 152 of the metal shell 15. A pair of projections 5120 are disposed on two sides of the second rear end 512.

The second front end 511 of the first member 51 is interference fit with the first rear end 152 of the metal shell 15. The second front end 511 of first member 51 and the first rear end 152 of the metal shell 15 are further connected by laser welding in some spots or full circumference to have a good strength. The second rear end 512 is telescoped on an outer side of the spacer 4.

The second member 52 has a closed circumference that has a good seal performance, a good anti-EMI performance, etc. The closed circumference of the second member 52 could be manufactured by drawing a metal piece, bending and forming a metal piece, die casting, etc. The second member 52 comprises a main portion 521 telescoped with the second rear end 512 of the first member 51, a ring portion 522 telescoped and crimped with the cable 3, and a third transition portion 523 between the main portion 521 and the ring portion 522. The diametrical dimension of the main portion 521 is larger than the diametrical dimension of the ring portion 522. The main portion 521 of second member 52 and the second rear end 512 of the first member 51 are further connected by spot laser welding to have a good strength.

The method of manufacturing the cable connector assembly 100 comprises the steps of: inserting the PCB 2 from the rear end of the inserting member 1 and soldering the extending beam 134 of the latch 13 to the metal pad 230 of the PCB 2; telescoping the second member 52 on the cable 3; extending the coaxial wires 31 and the single wires 32 defining a number of first single wires 321 and a number of second single wires 322 through the spacer 4 having a notch 49, the coaxial wires 31 passing through the first positioning holes 47 and the single wires 32 passing through the second positioning holes 48; securing wires to the spacer 4 through glue; bending rearwardly the extended single wires 32 in the spacer notch to be out of way, i.e., not in the operation path of the coaxial wires 31; operating the coaxial wires 31; returning the single wires 32 to its original state before bending; and then operating the extended cable wires of both coaxial wires 31 and the single wires 32; soldering the first conductor 311 to the corresponding second conductive pad 220; soldering the metal braided layer 313 of the coaxial wires 31 with the third conductive pads 221; soldering the second conductor 323 to the corresponding second conductive pad 220; moving the second member 52 forwardly and telescoping on the spacer 4; moving the second member 52 forwardly beyond the spacer 4 to latch with the first member 51; molding the strain relief 6 to enclose the inner member 5; mounting the housing 7 out of the inner member 5 and the strain relief 6 along the front to rear direction and using glue to fix the housing 7.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cable connector assembly comprising:
   an internal printed circuit board (PCB) defining a front end portion, an opposite rear end portion, and a middle portion, the PCB comprising a row of first conductive pads disposed on the front end portion, a row of second conductive pads disposed on the rear end portion, and a row of third conductive pads disposed behind the second conductive pads, the PCB having an upper surface and an opposite lower surface;

a cable electrically connected to the PCB and comprising a plurality of coaxial wires and a plurality of single wires, each coaxial wire having a first inner conductor soldered to a corresponding second conductive pad, an inner insulative layer enclosing the first inner conductor, a metal braided layer enclosing the inner insulative layer and soldered to a corresponding third conductive pad, and an outer insulative layer enclosing the metal braided layer; and a housing receiving the PCB; wherein some of the coaxial wires and some of the single wires adjacent to and arranged in a row with the some coaxial wires are disposed on at least one surface of the PCB, each single wire having a second conductor soldered to a corresponding second conductive pad, a first insulative layer enclosing the second conductor, and a second insulative layer enclosing the first insulative layer, the first insulative layer being made of heat-resisting material to protect the associated single wire when soldering the metal braided layer of the coaxial wire.

2. The cable connector assembly as recited in claim 1, wherein the single wires are disposed on a middle portion of the PCB, while the coaxial wires are disposed on two sides of the PCB.

3. The cable connector assembly as recited in claim 1, wherein the first insulative layer enclosed in the second insulative layer is made of PTFE (Polytetrafluoroethylene).

4. The cable connector assembly as recited in claim 3, wherein the second insulative layer is made of PET (Polyethylene terephthalate).

5. The cable connector assembly as recited in claim 4, wherein the single wires comprise a plurality of first single wires defining the second conductor and the first insulative layer, and a plurality of second single wires defining the second conductor, the first insulative layer, and the second insulative layer, the second single wires disposed adjacent to the coaxial wires.

6. The cable connector assembly as recited in claim 1, further comprising a spacer locating the cable.

7. The cable connector assembly as recited in claim 6, wherein the cable extends out of a rear end of the spacer and is fixed by glue, the second insulative layer being made of PET to convenient to fix the cable with the spacer.

8. The cable connector assembly as recited in claim 6, wherein the spacer comprises a holding slot for holding the PCB.

9. A cable connector assembly comprising:

a printed circuit board defining around a rear edge region thereon a plurality of front pads and a plurality of rear pads spaced from each other in a front-to-back direction, the front pads being arranged with one another in a transverse direction perpendicular to said front-to-back direction;

a cable including a plurality of coaxial wires and a plurality of single wires, each of the coaxial wires including an inner conductor, an inner insulative layer, an outer conductor and an outer insulative layer concentrically enclosed by one another in sequence from an inner side to an outer side, the inner conductor being soldering upon the corresponding front pad and the outer conductor being soldering upon the corresponding rear pad;

each of said single wires including a first conductor enclosed by a first insulative layer, the first conductor being soldered upon the corresponding front pad, the inner conductors of the coaxial wires being soldered upon the corresponding front pads commonly in a first region while the first conductors of the signal wires being soldered upon the corresponding front pads around a second region spaced from the first region in the transverse direction;

a spacer intimately located behind a rear edge of the printed circuit board and defining a plurality of through holes through which said coaxial wires and said single wires extend in the front-to-back direction; wherein the single wire closest to the first region than the others in the transverse direction, has the corresponding first insulative layer which is heat-resisting while not good in adhesion with regard to the spacer, and further a second insulative layer enclosing said first insulative layer, said second insulative layer being of good adhesion with regard to the spacer.

10. The cable connector assembly as claimed in claim 9, wherein the first insulative layer each of others of said single wires is of good adhesion with regard to the spacer.

11. The cable connector assembly as claimed in claim 9, wherein in the coaxial wire, the outer insulative layer is of good adhesion with regard to the spacer.

12. The cable connector assembly as claimed in claim 9, wherein a plurality of contact pads are formed on a front edge region of the printed circuit board for connecting to corresponding contacts in an electrically connector which is located in front of the printed circuit board, and an amount of the said contact pads is more than a sum of amounts of both said coaxial wires and said single wires.

13. The cable connector assembly as claimed in claim 9, wherein a plurality of contact pads are formed on a front edge region of the printed circuit board for connecting to corresponding contacts in an electrically connector which is located in front of the printed circuit board, an amount of said contact pads is more than a sum of amounts of the both said front pads and said rear pads.

14. The cable connector assembly as claimed in claim 9, wherein a dimension of the rear pad is larger than that of the front pad in the transverse direction.

15. The cable connector assembly as claimed in 14, wherein the rear pad extends in the transverse direction with an inner end proximate said single wire which is closest to the first region in the transverse direction.

16. A method of assembling a cable to a printed circuit board, comprising steps of:

providing a printed circuit board with a plurality of front pads and a plurality of rear pads in a front-to-back direction around a rear edge region, wherein an amount of the front pads is more than that of the rear pads, said front pads being arranged with one another along a transverse direction perpendicular to said front-to-back direction;

dividing said front pads into first and second regions in said transverse direction;

providing an insulative space located behind the printed circuit board in the front-to-back direction and formed with a plurality of through holes in the front-to-back direction;

providing a cable with a plurality of coaxial wires and a plurality of single wires; each of said coaxial wires including an inner conductor, an inner insulative layer, an outer conductor and an outer insulative layer concentrically enclosed by one another in sequence from an inner side to an outer side, the inner conductor being soldering upon the corresponding front pad and the outer conductor being soldering upon the corresponding rear pad, each of said single wires including a single conductor enclosed in an insulative layer;

soldering the inner conductors of the coaxial wires to the corresponding front pads in the first region, respectively, and soldering the single conductors of the single wires to the corresponding front pads in the second region, respectively; and soldering the outer conductors of the coaxial wires to the corresponding rear pads, respectively; wherein the single wires and the coaxial wires extend through the corresponding through holes of the spacer, and the insulative layer of one of said single wires which is closest to the first region, is essentially heat-resisting while being further joined with material at least on an exterior surface to be adhesive with regard to the spacer.

17. The method as claimed in claim 16, wherein the rear pad is larger than the corresponding front pad in the transverse direction so as to approach and be adjacent to said single wire closet to the first region.

18. The method as claimed in claim 16, wherein the insulative layer of said one of the single wires which is closest to the first region, forms by a first insulative layer made of heat-resisting material and a second insulative layer which is coated upon the first insulative layer and is of good adhesion with regard to the spacer.

19. The method as claimed in claim 16, wherein the insulative layer of each of others of said single wires is of good adhesion with regard to the spacer.

20. The method as claimed in claim 19, wherein the insulative layer of the single wire closest to the first region, is of a hybrid type while those of the others of said single wires are of an insulative mono-layer.

* * * * *